(12) United States Patent
Segal et al.

(10) Patent No.: US 9,530,037 B1
(45) Date of Patent: Dec. 27, 2016

(54) TOGGLING ACTIVATION OF LASERS IN SCANNER SYSTEMS

(71) Applicant: DATALOGIC AUTOMATION, INC., Telford, PA (US)

(72) Inventors: Kenneth Matthews Segal, Monte San Pietro (IT); David Warren Kliebhan, Newtown, PA (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/804,242

(22) Filed: Jul. 20, 2015

(51) Int. Cl.
*G06K 19/00* (2006.01)
*G06K 7/10* (2006.01)

(52) U.S. Cl.
CPC ....... *G06K 7/10574* (2013.01); *G06K 7/10584* (2013.01)

(58) Field of Classification Search
USPC ................. 235/435, 439, 454, 462
See application file for complete search history.

(56) References Cited

U.S. PATENT DOCUMENTS

| | | | |
|---|---|---|---|
| 5,483,051 A * | 1/1996 | Marchi | G06K 7/10574 235/462.22 |
| RE36,251 E | 7/1999 | Marchi | |
| RE37,017 E | 1/2001 | Stanzani et al. | |
| 2012/0120973 A1 | 5/2012 | Ziemkowski et al. | |

OTHER PUBLICATIONS

Datalogic Fixed Industrial Barcode Readers, Laser Bar Code Scanner DS8110, http://www.datalogic.com/eng/products/industrial-automation/fixed-industrial-barcode-readers/ds8110-pd-677.html, 2 pages.
Datalogic DS8110 Barcode Scanner Reference Manual, 257 pages.
Datalogic Fixed Industrial Barcode Readers, Laser Bar Code Scanner DX8210, http://www.datalogic.com/eng/products/industrial-automation/fixed-industrial-barcode-readers/dx8210-pd-684.html, 2 pages.
Datalogic DX8210 Omnidirectional Barcode Scanner Reference Manual, 266 pages.
Sick Sensor Intelligence Bar Code Scanners, http://www.sick.com/group/EN/home/products/product_portfolio/identification_systems/Pages/bar_code_scanners_series_6.aspx, 5 pages.
Sick Sensor Intelligence CLV69x Bar Code Scanner Technical Information, 77 pages.

(Continued)

*Primary Examiner* — Matthew Mikels
(74) *Attorney, Agent, or Firm* — Shook, Hardy & Bacon L.L.P.

(57) ABSTRACT

Scanners, methods, and computer storage media having computer-executable instructions embodied thereon that process variable sized objects with high package pitch on a moving conveyor belt are provided. The scanners are laser scanners that include at least two laser diodes, sensors, and field programmable gate arrays processors. The at least two laser diodes have different focuses. Each diode generates a laser beam when excited by an activation signal and an appropriate modulation. The sensors within the laser scanner device measure light reflected from a target on the objects. The processors toggle activation among the at least two laser diodes based on measurements sensed from the light reflected from the target.

20 Claims, 11 Drawing Sheets

(56) References Cited

OTHER PUBLICATIONS

Datalogic Fixed Industrial Barcode Readers, Laser Bar Code Scanner DS8100A, http://www.datalogic.com/eng/products/industrial-automation/fixed-industrial-barcode-readers/ds8100a-pd-355.html, 2 pages.
Datalogic DS8100A Reference Manual, 141 pages.
Datalogic Fixed Industrial Barcode Readers, Laser Bar Code Scanner DX8200A, http://www.datalogic.com/eng/products/industrial-automation/fixed-industrial-barcode-readers/dx8200a-pd-356.html, 2 pages.
Datalogic DX8200A Reference Manual, 139 pages.
Datalogic Fixed Industrial Barcode Readers, Laser Bar Code Scanner AXIOM, http://www.datalogic.com/eng/products/industrial-automation/fixed-industrial-barcode-readers/axiom-pd-544.html, 2 pages.
Datalogic Fixed Industrial Barcode Readers, Laser Bar Code Scanner AXIOM-X, http://www.datalogic.com/eng/products/industrial-automation/fixed-industrial-barcode-readers/axiom-x-pd-545.html, 2 pages.
Datalogic AXIOM / AXIOM-X Product Line Manual, 231 pages.

\* cited by examiner

TOGGLING ACTIVATION OF LASERS IN SCANNER SYSTEMS

BACKGROUND

Conventional scanners process packages by reading and decoding information affixed to the packages. In some instances, the information is read and decoded as the packages move along a conveyor system. Typically, the scanners incorporate a light source and a light-detecting means, such as charge-coupled device (CCD) sensors, complementary metal-oxide-semiconductor (CMOS) sensors, or avalanched photodiode (APD) sensors. A portion of the light that is reflected from the package is detected by the sensors and converted into an electrical signal, which is the basis for the object properties that include digital images of a package that has been read by the scanner. The reflected light is processed and decoded according to the instructions executed by one or more computer processors of the conventional scanners or the conveyor system.

The conventional scanners may be manufactured with two or more lasers. The two or more lasers may be focused at different distances inside a single scanner. The multiple foci may increase the depth of field for reading of images (e.g., barcodes) affixed to the packages. In the conventional scanners, the lasers related to the various focuses are activated sequentially and alternately: one for each scanning operation. If one scan is found to contain the image, all subsequent scans are performed by the same laser, until the object is outside of the depth of field for the scanner. After scanning of the image is complete, scanning may resume with cyclic alternation of the lasers.

In other conventional systems, the depth of field of the scanner may be increased by employing a laser with an adjustable lens. As the position of the lens changes, the focal point of the laser beam in relation to the laser scanner may increase or decrease.

These two conventional systems have drawbacks that include slow processing times, low scan rates, and increased points of failure due to moving mechanical parts. The moving focus mechanism of the scanner is relatively slow, expensive, and can be a potential reliability problem. To overcome these and other drawbacks, an improved scanner system that employs advanced digital signal processing with better reliability is provided below.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention increase the reading volume of a laser scanner. In the laser scanner, two or more lasers are focused differently, each with their own reading area. The laser beam that is focused at a given distance away from the object that the laser scanner is processing may be activated across the object's reading area. As the activated laser processes the object, the other lasers are deactivated until the target is fully processed. The scanner may be programmed to automatically determine, in real time, which laser to activate on a target. In some embodiments, the laser is activated based on, among other things, the distance measured between the object and the scanner.

The scanner, in one embodiment, may include a field programmable gate array (FPGA). The FPGA may be configured to activate and deactivate multiple lasers in the scanner. In one configuration, the FPGA may be embedded in the scanner and include logic for toggling among the lasers. The logic activates a laser in response to distance measurements and other signals generated by the scanner as the object is read by the lasers.

In alternative embodiments of the invention, in addition to distance measurements, the scanner may be programmed to activate and deactivate lasers in response to region of interest signals, line image processing signals, and pattern recognition algorithms that prevent improper laser toggling during object processing. In some instances, the algorithms may use delay to prevent toggling when changing to a different laser can impede processing.

BRIEF DESCRIPTION OF THE DRAWINGS

Embodiments of the invention are illustrated by way of example and not limited in the accompanying figures in which like reference numerals indicate similar elements and in which.

DETAILED DESCRIPTION

Figure 1:
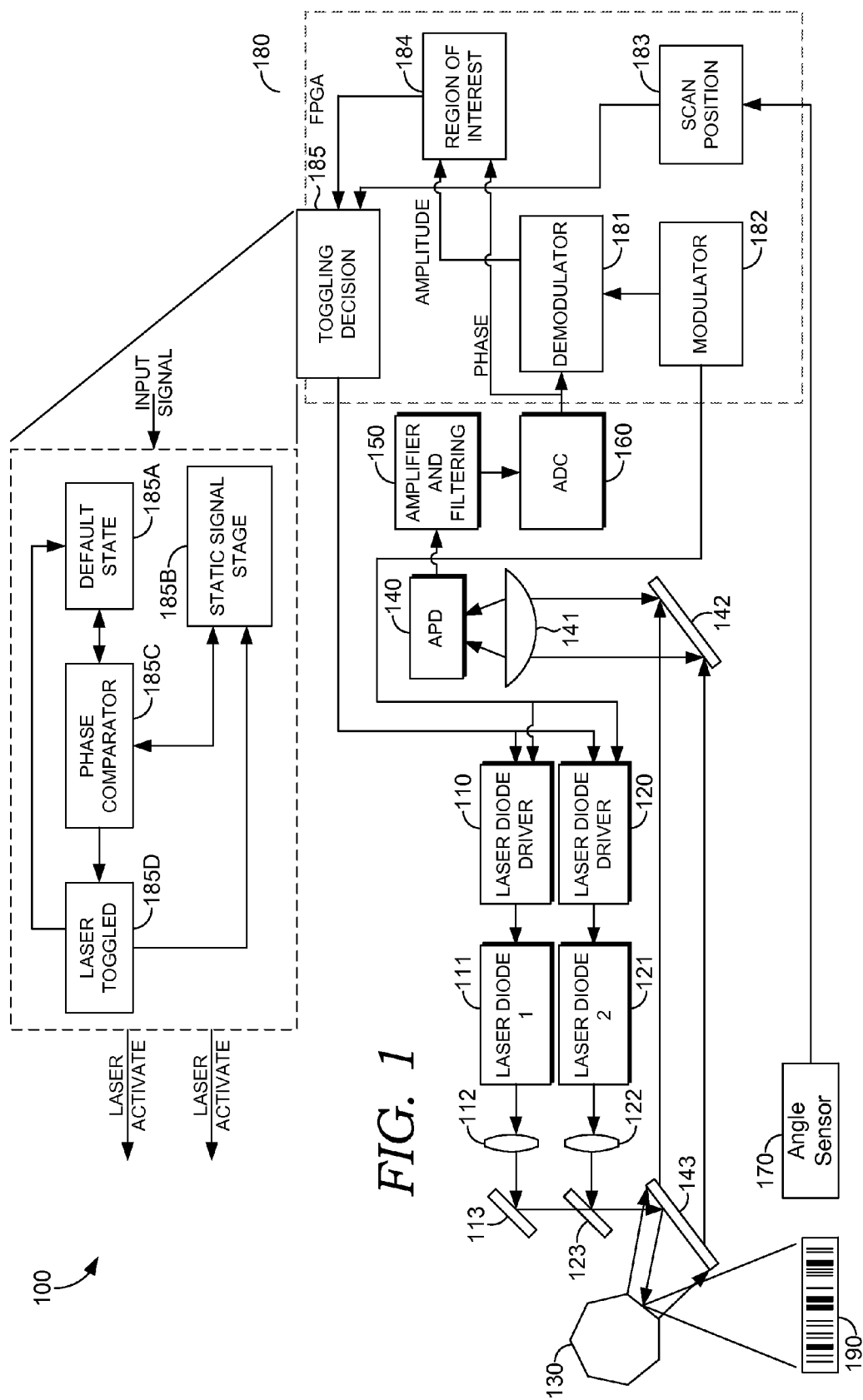
FIG. 1 is a schematic diagram of an exemplary scanner for object processing in accordance with embodiments of the invention.

The subject matter of the embodiments of the invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The embodiments of the scanner system described in this patent improve field of view and depth of field when processing an object by employing two or more lasers that are focused differently, each with their respective reading areas. In certain embodiments, the lasers may have overlapping reading areas. To decode characters affixed to the object, the laser that is better focused at a given distance away from the object may be activated to read the characters on an object. At the same time, the other lasers in the scanner are deactivated. The scanner is programmed to automatically determine, in real time through digital signal processing and logic, which laser to activate on the object based on a signal that provides, among other measurements, the distance between the object and the scanner.

Other embodiments of the invention provide a scanner that stores signal measurements in a history that can be accessed for machine learning, pattern recognition, and decision processing. The FPGA may perform hysteresis to inform the scanner of an optimal time to toggle among lasers based on the signal measurements obtained in previous time periods. The state machine in the FPGA is configured to process several signal measurements when determining the optimal time to toggle the lasers.

Accordingly, embodiments of the invention eliminate the need to move focus mechanisms in scanner devices that obtain images of objects on a conveyor belt. The scanner devices include an optical element that has sensors, which process light reflected by the objects on the conveyor belt. The sensors may provide signal measurements to the FPGA, which determines whether to toggle the lasers.

Throughout this patent, several acronyms and shorthand notations are used to aid the understanding of certain concepts pertaining to the associated system and services. These acronyms and shorthand notations are intended to help provide an easy methodology for communicating the ideas expressed herein and are not meant to limit the scope of the embodiments of the invention. The following is a list of these acronyms (in alphabetical order):

Complex Programmable Logic Devices (CPLD), Programmable Logic Arrays (PLA), Microprocessors, System on a Chip (SoC) devices and combinations thereof"
ADC Analog Digital Converter
ASIC Application Specific Integrated Circuit
APD Avalanche Photodiode
CPU Central Processing Unit
CPLD Complex Programmable Logic Devices
DVD Digital Versatile Disc
EAS Electronic Article Surveillance
EE-PROM Electronically Erasable Programmable Read-only Memory
E-ISBN Electronic International Standard Book Number
FPGA Field-Programmable Gate Array
ISBN International Standard Book Number
NFC Near Field Communication
PDA Personal Data Assistant
PLA Programmable Logic Arrays
RAM Random Access Memory
RFID Radio Frequency Identification
ROM Read-only Memory
SSCC Serial Shipping Container Code
SoC System on a Chip
UPC Universal Product Code
WiFi Wireless Fidelity Further, various technical terms are used throughout this description. An illustrative resource that fleshes out various aspects of these terms can be found in Newton's Telecom Dictionary, 25th Edition (2009).

Accordingly, embodiments of the invention provide a laser scanner that has at least two lasers with multiple sensors for decoding characters on an object. The laser scanner may toggle between lasers as objects moving on the conveyor belt are processed. The configuration of the lasers and sensors may vary according to several embodiments of the invention.

In one embodiment, the laser scanner includes at least two laser beam sources. The laser beam sources are coupled to an FPGA via a laser driver diode. The laser driver diode is controlled by the FPGA that decides which of the lasers, if any, should be active at a given time. The FPGA, in certain embodiments, may include a toggling decision algorithm component that activates the appropriate laser as the objects are processed on the moving conveyor belt.

FIG. 1 is a schematic diagram of an exemplary scanner 100 for object processing in accordance with embodiments of the invention. The scanner 100 includes laser diode drivers 110 and 120, which drive laser diodes 111 and 121 to emit a laser beam through optical elements 112, 113, 122, 123, and 143. The laser beam is directed by the optical elements 112, 113, 122, 123, and 143 to a polygon 130 that generates scan lines. The scan lines focus on the object 190 in a target area below the laser scanner 100. The light in the scan lines is reflected from the object 190 and the target area back to the polygon 130. The reflected light is directed to sensors 140 and 170. The sensors 140 and 170 process the reflected light to provide measurement signals to the FPGA 180, which controls activation and deactivation of the laser diode drivers 110 and 120.

Optically, the laser scanner 100 generates light for the scan lines when the laser diode drivers 110 and 120 are activated. To generate the laser beam, the FPGA 180 provides an activation signal and modulation frequency to one of the two or more laser diode drivers 110 and 120. The laser diode driver 110 is coupled to the FPGA 180 and obtains a signal to activate or deactivate the laser diode 111. The laser diode 111 is connected to laser diode driver 110. In response to a high (ON) signal from the laser diode driver 110, the laser diode 111 emits modulated light that is focused by the lens 112 and directed by mirrors 113 and 143 to the polygon 130.

Similarly, upon selecting a laser controlled by laser diode driver 120, a laser beam is produced with a focus different from the laser beam generated by the laser diode driver 110. The laser diode driver 120 also is coupled to the FPGA 180 and obtains a signal to activate or deactivate the laser diode 121. The laser diode 121 is connected to laser diode driver 120. In response to a high (ON) signal from the laser diode driver 120, the laser diode 121 emits modulated light that is focused by the lens 122 and directed by mirrors 123 and 143 to the polygon 130. The lenses 112 and 122 each have a different focus, which alters the field of view and depth of field for the laser scanner.

In one embodiment, the lens 112 is focused so that the focal point, and therefore its subsequent reading field, is closer to the laser scanner, while the other lens 122 is focused slightly further away. These focal points may be set so that there will be a small amount of overlap in reading field performance for a character in the target area below the scanner.

The polygon 130 generates the scan line that is directed to the object 190 and the target area below the scanner. In one embodiment, the polygon 130 may have between 6 and 8 sides. Each side may contain a mirror that reflects the light from the laser. The scan line is a beam directed from the polygon 130 to the object 190 and the target area. In turn, the object 190 and the target area reflect the light in the scan line back to polygon 130. This reflected light is directed from the polygon 130 to mirrors 143 and 142, and is measured by the sensors 140 and 170.

The sensor 140 is an APD sensor. The APD sensor 140 is a sensitive sensor that operates to measure the number of photons that are focused by lens 141. The lens 141 receives the light that is directed through a series of mirrors 142 and 143 from the mirrored polygon 130 that rotates at a fixed speed. As a result of the rotation, the APD sensor 140 obtains light that is produced from a one-dimensional scan pattern. The one-dimensional scan pattern is generated by the polygon 130 and reflected off the object 190 and target area below the scanner. In turn, the light from the reflected one-dimensional scan pattern is reflected off the polygon 130 and directed by mirrors 142 and 143 to lens 141, which focuses the light before entering the APD sensor 140.

The APD sensor 140 is coupled to an amplifier and filtering component 150. The amplifier and filtering component 150 recovers the signals by removing background noise. In turn, the recovered signal is processed by an ADC 160 to output a digital signal to the FPGA 180.

In one embodiment, the sensor 170 is an angle sensor that determines the angle at which discrete light, separate from the one-dimensional scan pattern, is reflected by the polygon 130. The angle sensor 170 may operate as follows. For instance, the light is emitted from the laser diode 111, travels through the lens 112, reflects off a first mirror 113, and reflects off another mirror 143 to the mirrored polygon 130. Depending on the rotation of the mirrored polygon 130, the light will reflect off one of the mirrors at a range of different angles. For a large number of these angles, the light will shine out of the scanner and into space. For a very small number of angles (e.g., a few degrees), the light will not shine out of the scanner, but instead shines into the angle sensor 170. The angle sensor 170 is in a fixed position, and requires a relatively high power of light (i.e. direct laser light from a mirror, and not from another much-less-reflective surface, such as a barcode target) for it to generate a signal. If the mirrored polygon 130 rotates with a stable angular velocity, this angle sensor signal will be very periodic and predictable. As a result, we can use the time when the angle sensor 170 becomes active as a reference point for all other angles within the scan line. The FPGA 180 has a scan position component 183 that operates as a counter that resets every time the angle sensor becomes active.

In other embodiments, the start of the scan line can be determined from a hall sensor in the motor or from a separate photonic system under the mirrored polygon.

The beams are reflected through a series of mirrors until they are directed onto a mirrored polygonal rotor, which rotates at a fixed speed. As a result of the rotation, the light generated by the laser diode 111 or 121 is reflected from the polygon to generate a one-dimensional scan pattern that reflects off targets, then the polygon again, through a few mirrors and ultimately into an APD sensor. This signal gets amplified and then run through an ADC into an FPGA. The signal then gets demodulated, extracting the magnitude of the reflected light pattern and the phase of the carrier signal.

The FPGA 180 receives signal measurements from at least two sensors: APD sensor 140 and angle sensor 170. The FPGA 180 provides activation signal output to the laser diode drivers 110 and 120. As explained above, the activation signal from the FPGA 180 includes the modulation frequency and the selection of the optimal laser.

In one embodiment, the FPGA 180 may include a demodulator component 181, a modulator component 182, a scan position component 183, a region of interest component 184, and a toggling decision component 185. The FPGA is both a processing component of the scanner, and a combination of the hardware and programmable software. The hardware includes computing elements and storage elements, whereas the software includes the logic instructions for the computing and storage elements.

The demodulator component 181 extracts the information from the carrier frequency set by the modulator 182. The demodulator component 181 receives the amplified, filtered, and converted signal from the APD sensor 140. The APD sensor 140 signal is converted from analog to digital by ADC 160. In turn, the demodulator component 181, in one embodiment, extracts the phase, amplitude, and region information from the converted signal. The region of interest measurement is transmitted to the region of interest component 184 for further processing. In turn, the phase and amplitude measurements are transmitted to the toggling decision component 185 for additional processing.

In other embodiments, the demodulator component 181 extracts amplitude information from the digital signal received by the ADC 160. The demodulator component 181 transmits the extracted amplitude measurement to the region of interest component 184, which processes a modulated digital signal from the ADC sensor 160 with the amplitude measurements to provide the toggling decision component 184 one or more region measurements.

The modulator component 182 selects a carrier frequency for the signal that is generated by the laser scanner 100. The modulator component 182 may store the frequency at which the information signal is modulated and provide the frequency to the laser diode drivers 110 and 120 and demodulator component 181. Based on this frequency, the laser driver generates a laser with the selected frequency. In turn, the information-carrying signal is extracted by the demodulator component 181 to provide the appropriate signal measurements from the light sensed by APD sensor 140.

The scan position component 183 obtains the angle measurement from angle sensor 170. The scan position component 183 detects the beginning of each scan line. In some embodiments, the scan position component 183 stores the angle measurement and available rotation count for processing by the toggle decision component 185. The scan position may include a historical record of the angle measurements for the various objects processed by the laser scanner.

In some embodiments, the scan position component 183 may have a counter that resets after it reaches ~100,000 clock periods of receiving a measurable signal from the polygon 130. If the scan position component 183 has a count of 0, the toggling decision component 181 of the FPGA 180 knows that the mirrored polygon is rotated so that the laser is shining on the angle sensor, and it is at the start of the scan line. If the scan position has a count of 50,000, the toggling decision component 181 of the FPGA 180 knows that the mirrored polygon is rotated so that the laser is shining out of the scanner into space near the center of the scan line. If the scan position component 183 has a count of 90,000, the toggling decision component 181 of the FPGA 180 knows that the mirrored polygon is rotated so that the laser is shining out of the scanner into space and toward one end of the scan line.

The region of interest component 184 may identify the portion of the target area that includes a string of character codes. The region of interest component 184 receives region information for the target area from the demodulator 181, in some embodiment. The region information may be calculated primarily through the amplitude information (e.g., magnitude) of signal processed by the demodulator component 181. In other embodiments, the region of interest component 184 receives from the demodulator component 181 an amplitude measurement extracted from the demodulated digital signal converted by ADC 160. In addition to amplitude measurement, the region of interest component 184 may obtain a modulated signal from the ADC sensor 160. In turn, the region of interest component processes both the amplitude measurement and the modulated digital signal to identify the regions of interest.

In some embodiments, the region information may be derived by the region of interest component and may include at least four signal measurements: white zone, black zone, bar zone, and fast zone. The white zone signal measurement indicates the presence of a stable amplitude and reliable phase information. The black zone signal measurement indicates the presence of a stable amplitude, but unreliable phase information. The bar zone signal measurement indicates the presence of a region of interest (e.g., possibly barcode) being detected. The fast zone signal measurement indicates the presence of a region of interest being detected, although it is calculated more quickly than the bar zone signal and may be less reliable.

The region of interest component 184 may store the identified region information for processing by the toggling decision component 185. In one embodiment, the region of interest component 184 provides a historical record of the regions processed by the lasers.

The toggling decision component 185 is a processing component that selects one of the lasers for activation based on signal measurements that include, among other things, a measurement of the distance between the object 190 and the scanner 100. The toggling decision component 185 obtains phase and amplitude signal measurements from the demodulator component 181, in certain embodiments. Additionally, in some embodiments, the toggling decision component 185 accesses angle and position signal measurements from the scan position component 183. The toggling decision component 185 obtains region signal measurements from the region of interest component 184. In further embodiments, the toggling decision component does not receive phase and amplitude signal measurements but does received angle, position, and region signal measurements. In turn, the FPGA processes the received signal measurements to select an appropriate laser for activation. The processing logic is based on a state machine programmed in the toggling decision component 185.

In one embodiment, the state machine includes at least four states: default state 185A, static signal state 185B, phase comparator state 185C, and laser toggled state 185D. The state machine responds to patterns detected in the signal measurement to move between states. For instance, amplitude and phase signal measurements may cause the state machine to transition from the default state 185A to the static state 185B or the phase comparator state 185C.

The default state 185A is the state in which the laser scanner is positioned after initialization. Because the state machine is not a fully connected network of states, the state machine is unable to transition to the laser toggled state 185D directly from the default state 185A, in one embodiment. In an alternative embodiment, the state machine is fully connected, which would allow a transition from the default state 185A to the laser toggled state 185D. In most instances, from the default state 185A, the state machine may transition to either the static signal state 185B or the phase comparator state 185C, based on the signal measurements received by the toggling decision component 185.

The state machine may transition to the static signal state 185B from the default state 185A when the signal phase measurement is reliable and the measurement signal from the region of interest is null. The state machine transitions to the phase comparator state 185C from the default state 185A when a significant change in the phase signal measurement is observed. A change may be flagged as significant based on historical measurements of the phase. For instance, a phase measurement may be significant when the absolute value of the difference between a current phase measurement and a previous phase measurements is greater that 12°. Alternatively, the state machine may transition to the phase comparator state 185C from the default state 185A if the phase signal measurement changes from having an unreliable phase measurement signal to a reliable phase measurement signal.

The static signal state 185B is a temporary state, in most embodiments. In some embodiments, while in the static signal state 185B, the scanner 100 obtains additional signal measurements from the sensors 140 and 170. As explained above, because the state machine is not fully connected, the state machine is unable to transition directly from the static signal state 185B to the laser toggled state 185D, in one embodiment. In an alternative embodiment, the state machine is fully connected, thus allowing a transition from the static signal state 185B to the laser toggled state 185D. In most instances, from the static signal state 185B, the state machine may transition to either the default state 185A or the phase comparator state 185C, based on the signal measurements received by the toggling decision component 185.

From the static signal state 185B, the state machine may transition to the default state 185A when a region of interest is detected in the region signal measurement. Additionally, the state machine may transition to the default state 185A from the static signal state 185B when phase measurements change from reliable to unreliable. In the static signal state 185B, the state machine may transition to the phase comparator state 185C when a significant change in phase is observed. As explained above, a phase measurement may be significant when the absolute value of the difference between a current phase measurement and a previous phase measurements is greater that 12°. Additionally, the state machine may transition to the phase comparator state 185C from the static signal state 185B based on region signal measurements from previous scan periods. For instance, the region signal measurements of the previous scan periods may be retrieved from the region of interest component 184 and processed to estimate the location of a region of interest in the current scan period. If a region of interest is likely to be located in the current scan period, the state machine transitions to the phase comparator state 185C.

The phase comparator state 185C is a calculation state. In some embodiments, while in the phase comparator state 185C, the scanner 100 compares phase measurements. As explained above, because the state machine is not fully connected, the state machine is unable to transition from the laser toggled state 185D directly to phase comparator state 185C, in one embodiment. In an alternative embodiment, the state machine is fully connected, thus allowing a transition from the laser toggled state 185D to the phase comparator state 185C. In most instances, from the phase comparator state 185C, the state machine may transition to either the default state 185A, the static signal state 185B, or the laser toggled state 185D, based on the signal measurements received by the toggling decision component 185.

From the phase comparator state 185C, the state machine may transition to the laser toggled state 185D based on phase measurement signals. The current phase measurement signal is compared to a defined phase level. The defined phase level is a region that includes distance, location, and size of an overlapping portion in the target areas viewed by at least two of the lasers in the laser scanner. Each of the lasers may have a predefined phase level. When the current phase measurement signal is within the defined phase level for one of the lasers, the state machine may switch to the laser toggle state 185D. From the phase comparator state 185C, the state machine may transition to the static signal state 185B when the current phase measurement is outside of the defined phase level. Additionally, the state machine may transition to the static signal state 185B from the phase comparator state 185C when scan position is null. In other embodiments, the state machine may transition to the static signal state 185B from the phase comparator state 185C when a delay is necessary to obtain additional measurements from one of the sensors 140 or 170.

From the phase comparator state 185C, the state machine may transition to the default state 185A when a region of interest measurement signal is null. Additionally, the state machine may transition to the default state 185A from the phase comparator state 185C when phase measurement changes from reliable to unreliable.

The laser toggled state 185D selects a laser diode driver 110 or 120 for activation based on, among other things, the phase measurement. The laser toggled state 185D provides hysteresis to laser switching. In the laser toggled state 185D, the state machine may determine that the current laser should remain activated. Alternatively, the state machine may determine that the current laser should be deactivated. The laser may deactivate the active laser when the region of interest measurement is null in some embodiments. In other embodiments, the state machine may deactivate the active laser when the scan position has a significant change. The laser toggled state 185D allows the state machine to recover or settle from the toggling noise by implementing a delay before switching among lasers. As explained above, because the state machine is not fully connected, the state machine is unable to transition from the laser toggled state 185D directly to phase comparator state 185C, in one embodiment. In an alternative embodiment, the state machine is fully connected, thus allowing a transition from the laser toggled state 185D to the phase comparator state 185C. In most instances, from the laser toggled state 185D, the state machine may transition to either the default state 185A or the static signal state 185B, based on the signal measurements received by the toggling decision component 185.

From the laser toggled state 185D, the state machine may transition to the static signal state 185B when the phase measurement signal continues to be reliable.

Alternatively, the state machine may transition to the default state 185A. When the scanner is in the laser toggled state 185D, a delay (e.g., n clock periods; where n is greater than 10 second) is initialized, in at least one embodiment. Thus, the scanner is unable to reenter the laser toggled state 185D and so switches lasers again too quickly after it just did. Once the delay of n clock periods expires, and the state machine continues to receive phase measurement signals that are reliable, and the state machine transitions to the static signal state 185B. Otherwise, after the delay, the state machine transitions to the default state 185A. In other words, the state machine always exits the laser toggled state 185D after the delay expires.

Accordingly, the state machine is a machine learning component of the FPGA 180 that allows a laser scanner 100 to increase the scan rate without reducing the combined read area of multiple lasers. With the advanced signal processing and complex pattern recognition, the laser scanner 100 is able to decode and improve performance when decoding codes (with poor visibility) affixed to objects.

The object 190 may include a string of character codes. For instance, the object 190 may include a barcode. The barcode may represent EAS, E-ISBN, ISBN, RFID, UPC, and SSCC, in some embodiments. The object 190 is decoded by the laser scanner 100 as the object moves on the conveyor belt.

Accordingly, the embodiments of the invention provide a laser scanner that scans objects at variable distances without excess moving mechanical parts. The laser scanner is configured with advanced digital processing hardware that enables pattern recognition and machine learning processing when decoding difficult codes. In most embodiments, the advanced digital processing hardware improves scan rates as the objects move along on a conveyor belt.

The toggling component of the laser scanner enables the processing of codes affixed to objects that vary in size, color, weight, etc. FIGS. 2-10 illustrate four examples of the advanced processing capabilities of the laser scanner configured according to the embodiments of the invention. In a first example, in FIGS. 2-3, the laser scanner is able to process codes when the background and object label are both highly reflective. In a second example, in FIGS. 4-5, the laser scanner is able to process codes when the background is not reflective but the object labels are reflective. In a third example, in FIGS. 6-7, the laser scanner is able to process codes when the background is noisy but the object labels are reflective. In a fourth example, in FIGS. 8-10, the laser scanner is able to process codes that are affixed to a small portion of an object with large dimensions.

Figure 2:
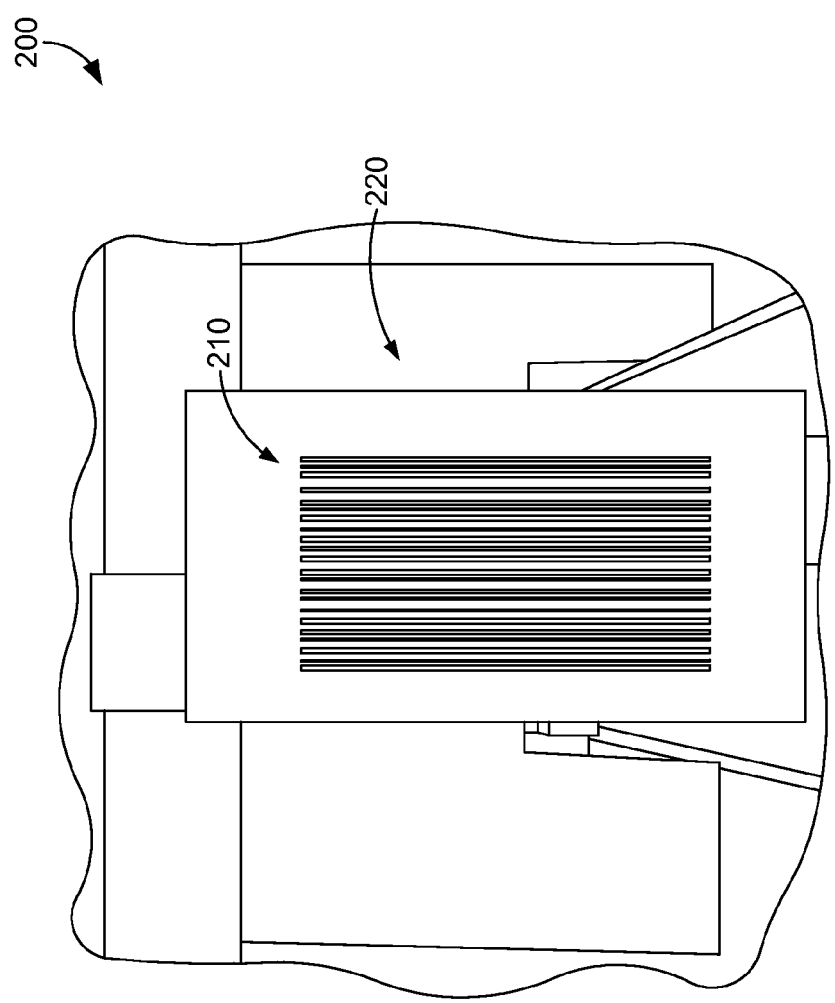
FIG. 2 is an illustration of an object, with a reflective target in the background, processing the object by the exemplary scanner in accordance with embodiments of the invention.

FIG. 2 is an illustration of an object with a reflective target in the background and processing the object by the exemplary scanner in accordance with embodiments of the invention. The field of view of the laser scanner shows a code 210 on a background 220. Both the code 210 and background 220 are highly reflective. The laser scanner is able to process the background 220 and code 210 to decode the code 210.

Figure 3:
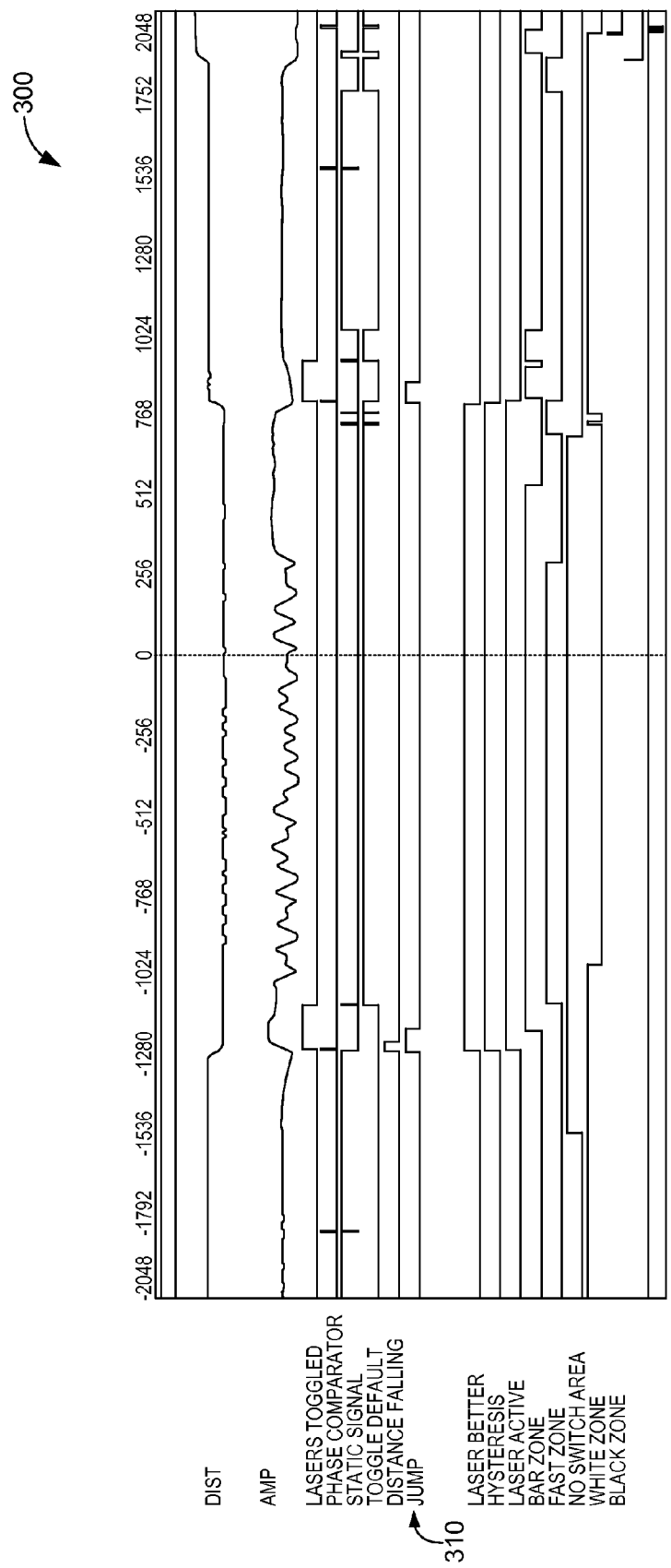
FIG. 3 is a signaling diagram of the exemplary scanner that processes the object of FIG. 2 in accordance with embodiments of the invention.

The signaling data generated by the object with code 210 of FIG. 2 is illustrated in FIG. 3. FIG. 3 is a signaling diagram 300 of the exemplary scanner that processes the object of FIG. 2 in accordance with embodiments of the invention. The signal diagram 300 includes measurements sensed by the laser scanner. For instance, the jump measurement 310 is a measurement of the phase signal obtained by the laser scanner. The jump measurement 310 at the approximate time period −1280 has a significant change that causes the laser scanner to determine whether the appropriate laser is activated. In most embodiments, the laser scanner toggles from the far laser to the near laser as illustrated. The signaling diagram 300 confirms that the laser toggling operates as expected when processing the code 210 on an object.

Figure 4:
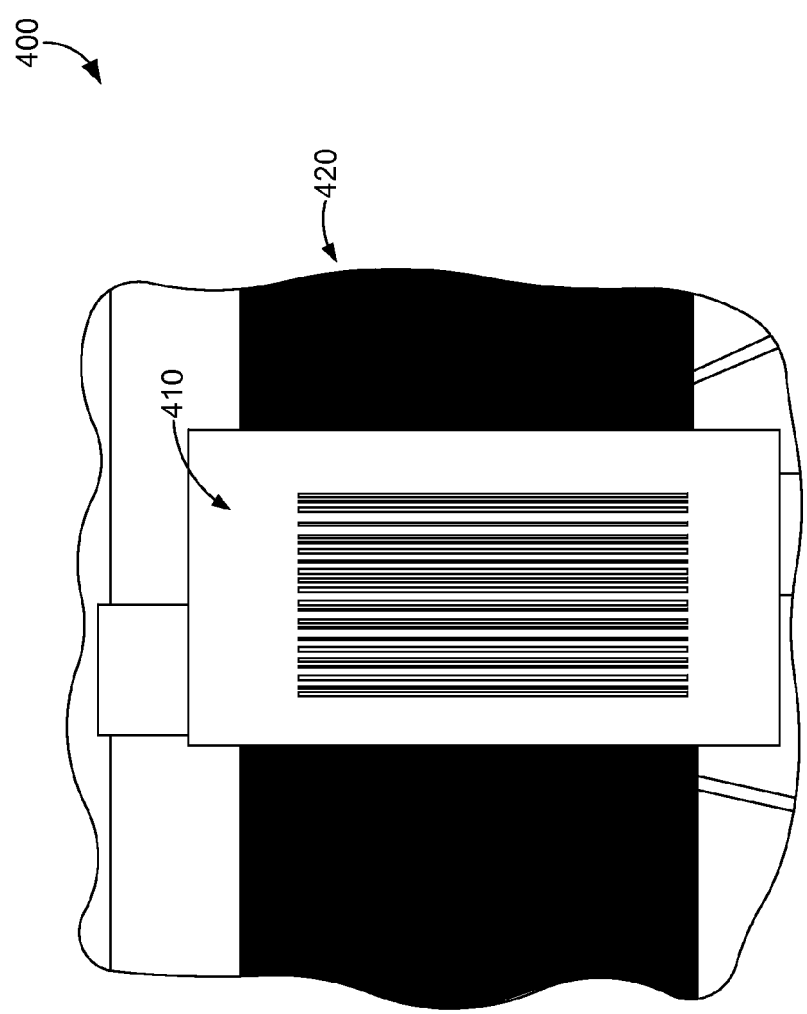
FIG. 4 is another illustration of an object, with a non-reflective target in the background, processing the object by the exemplary scanner in accordance with embodiments of the invention.

FIG. 4 is another illustration of an object with a non-reflective target in the background and processing the object by the exemplary scanner in accordance with embodiments of the invention. The laser scanner's field of view detects a code 410 on a background 420. The code 410 is highly reflective, but the background 420 is non-reflective. The laser scanner is able to process the background 420 and code 410 to decode the code 410.

Figure 5:
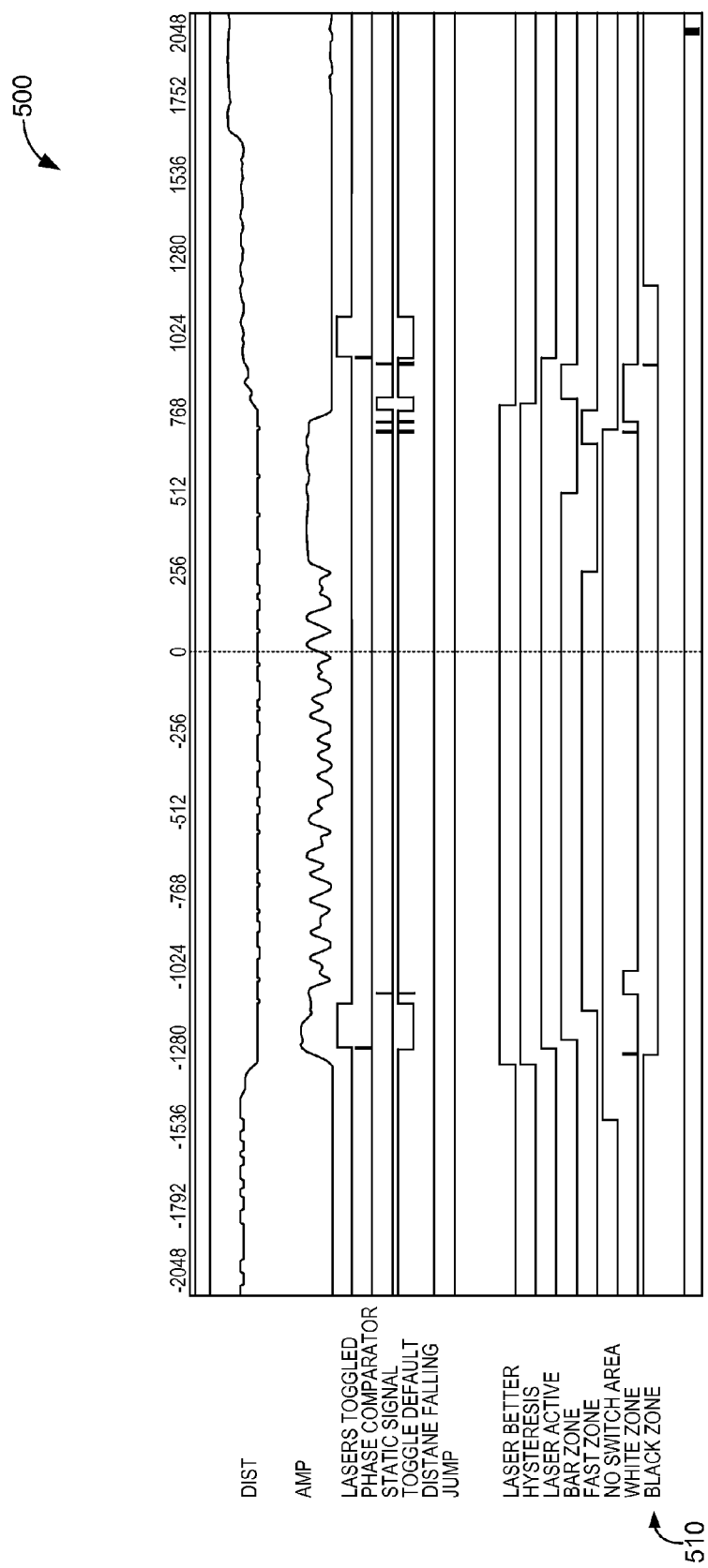
FIG. 5 is a signaling diagram of the exemplary scanner that processes the object of FIG. 4 in accordance with embodiments of the invention.

The signaling data generated by the object with code 410 of FIG. 4 is illustrated in FIG. 5. FIG. 5 is a signaling diagram 500 of the exemplary scanner that processes the object of FIG. 4 in accordance with embodiments of the invention. The signal diagram 500 includes measurements sensed by the laser scanner. For instance, the black zone measurement 510 is a measurement of the laser scanner's measurement of the transition from the non-reflective region (e.g., conveyor belt) to the reflective region (e.g., label) processed by the laser scanner. The black zone measurement 510 at approximately time period −1280 has a significant change, which causes the laser scanner to enter a delay and allows the measurement of phase and region values to normalize. The signaling diagram 500 confirms that the laser toggling operates as expected when processing the code 410.

Figure 6:
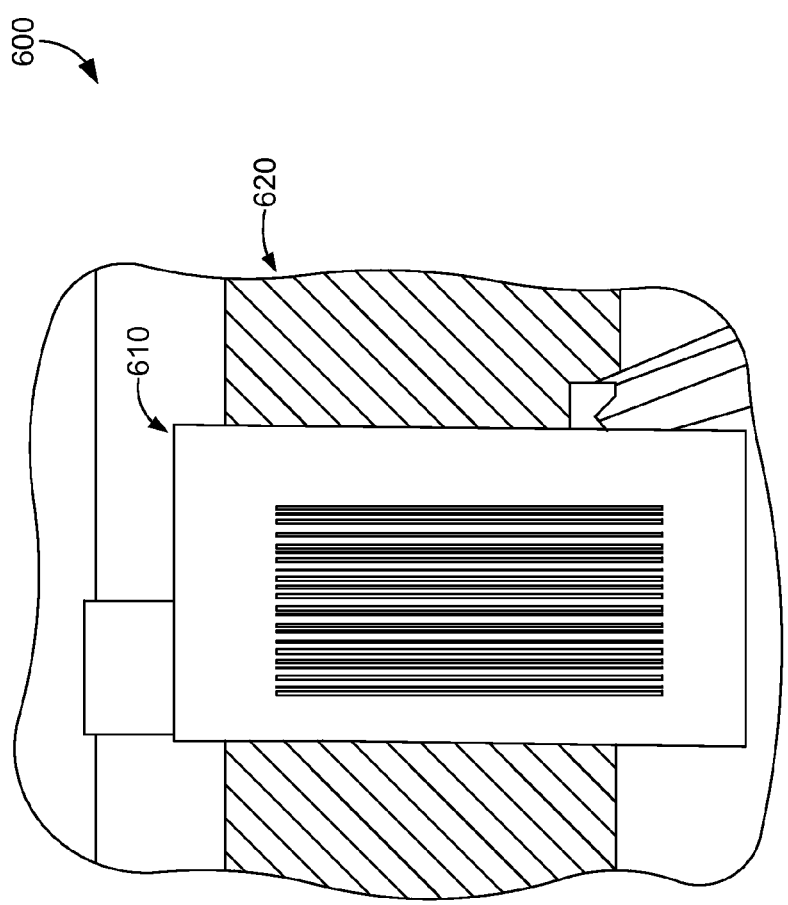
FIG. 6 is another illustration of an object, with a noisy target in the background, processing the object by the exemplary scanner in accordance with embodiments of the invention.

FIG. 6 is another illustration of an object with a noisy target in the background and processing the object by the exemplary scanner in accordance with embodiments of the invention. The field of view of the laser scanner detects a code 610 on a background 620. The code 610 is highly reflective, but the background 620 is noisy. The laser scanner is able to process the background 620 and code 610 to decode the code 610.

Figure 7:
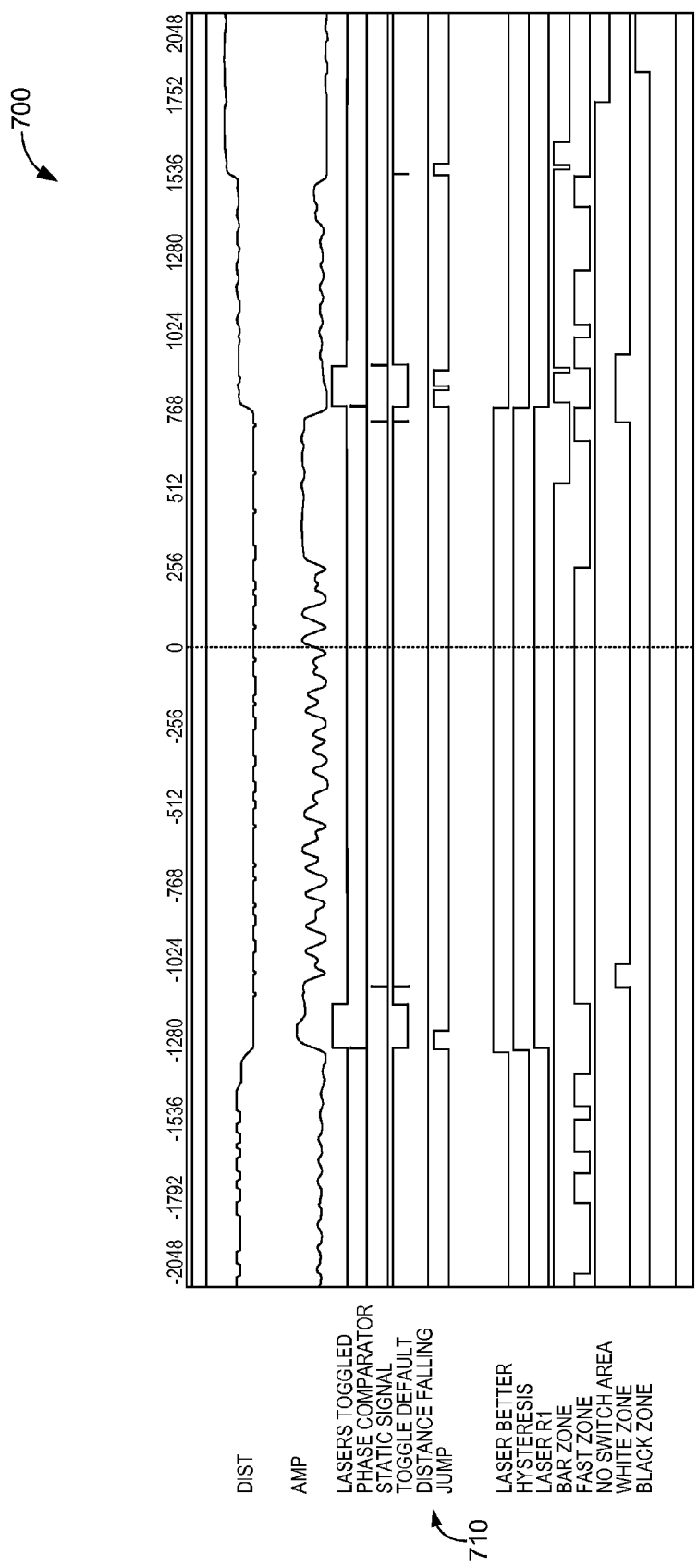
FIG. 7 is a signaling diagram of the exemplary scanner that processes the object of FIG. 6 in accordance with embodiments of the invention.

The signaling data generated by the object with code 610 of FIG. 6 is illustrated in FIG. 7. FIG. 7 is a signaling diagram 700 of the exemplary scanner that processes the object of FIG. 6 in accordance with embodiments of the invention. The signal diagram 700 includes measurements sensed by the laser scanner. For instance, the jump measurement 710 is a measurement of the phase signal obtained by the laser scanner. The jump measurement 710 at approximately time period −1280 has a significant change that causes the laser scanner to determine whether the appropriate laser is activated. In most embodiments, the laser scanner toggles from the far laser to the near laser, as illustrated. The signaling diagram 700 confirms that the laser toggling operates as expected when processing the code 610 on an object.

Figure 8:
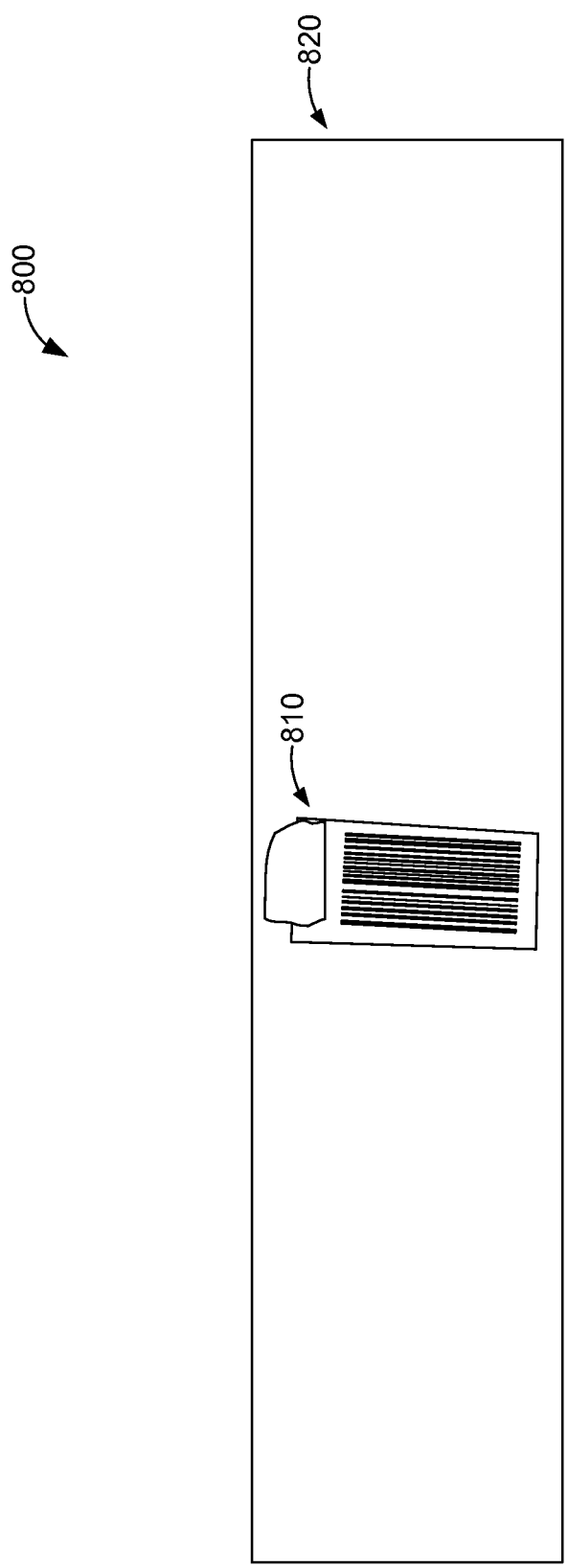
FIG. 8 is another illustration of an object with wide dimensions that is processed by the exemplary scanner in accordance with embodiments of the invention

FIG. 8 is another illustration of an object with wide dimensions that is processed by the exemplary scanner in accordance with embodiments of the invention. The field of view of the laser scanner detects a code 810 on a wide background 820. The code 810 is highly reflective, but the background 820 is large. The laser scanner is able to process the background 820 and code 810 to decode the code 810.

Figure 9:
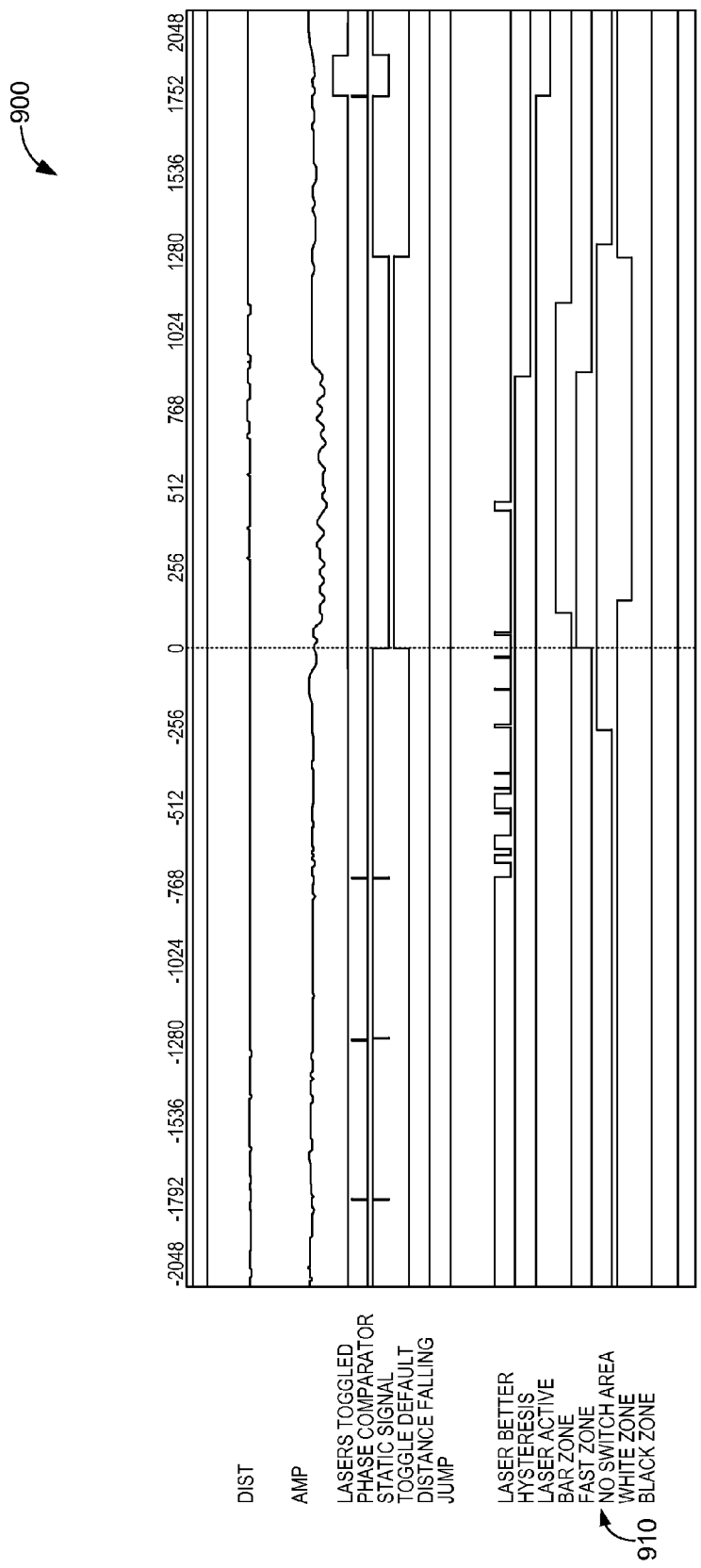
FIG. 9 is a signaling diagram of the exemplary scanner that processes the object of FIG. 8 in accordance with embodiments of the invention.
Figure 10:
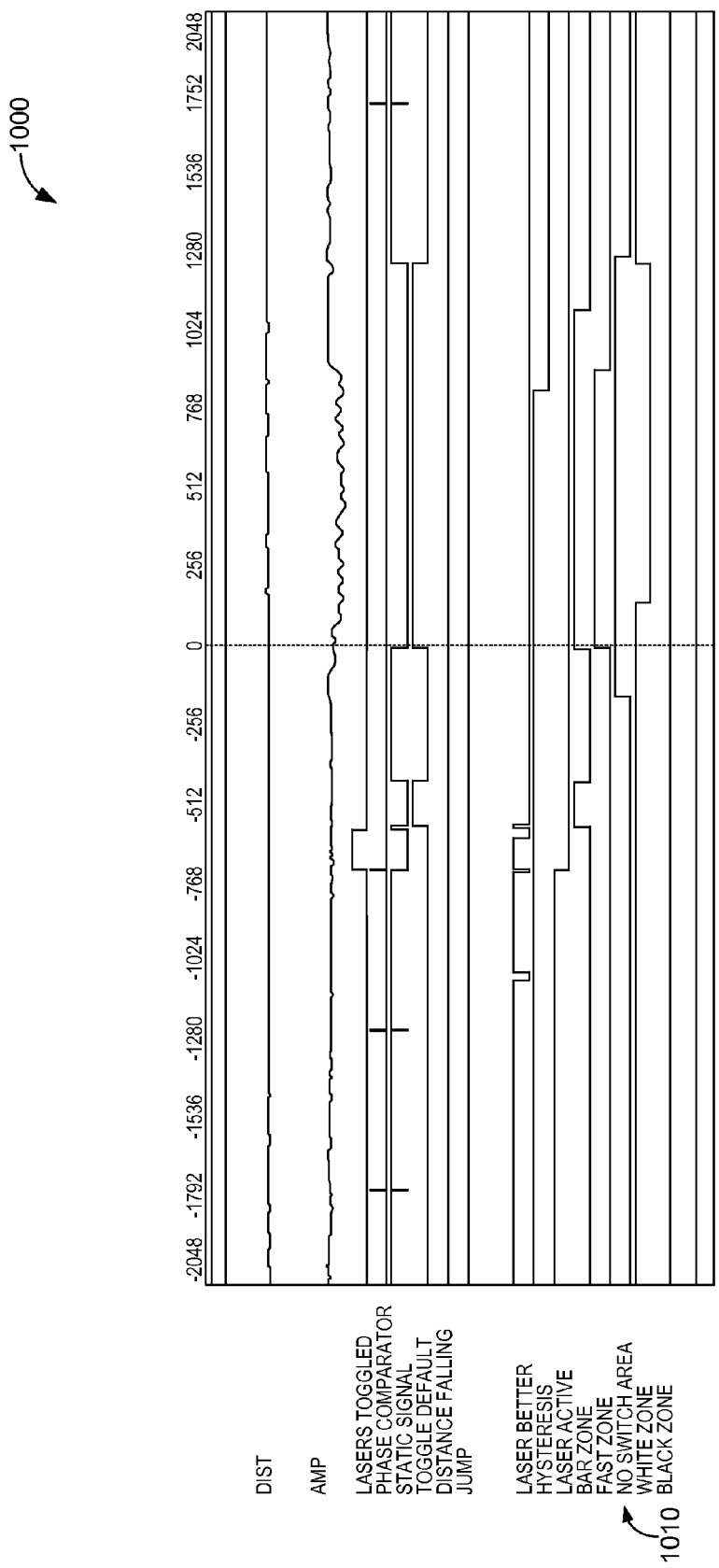
FIG. 10 is another signaling diagram of the exemplary scanner that processes the object of FIG. 8 in accordance with embodiments of the invention.

The signaling data generated by the object with code 810 of FIG. 8 is illustrated in FIGS. 9 and 10. FIG. 9 is a signaling diagram 900 of the exemplary scanner that processes the object of FIG. 8 in accordance with embodiments of the invention. FIG. 10 is another signaling diagram 1000 of the exemplary scanner that processes the object of FIG. 8 in accordance with embodiments of the invention.

The signal diagram 900 includes measurements sensed by the laser scanner. For instance, the no-switch area measurement 910 is a measurement that prevents the laser from toggling. The no-switch area measurement 910 at approximately time period −256 has a significant change, which causes the laser scanner to determine that toggling is inappropriate. In most embodiments, the no-switch area measurement 910 is triggered when variable amplitude of the demodulated signal is provided to the toggle decision component of the FPGA. The laser scanner is unable to toggle from the far laser to the near laser when the no-switch area measurement is high. The signaling diagram 900 confirms that the laser toggling operates as expected when processing the code 910 on an object. In signal diagram 900, the lasers are allowed to toggle when the no-switch area measurement is low after processing the code 810.

FIG. 10 is another signaling diagram 1000 of the exemplary scanner that processes the object of FIG. 8 in accordance with embodiments of the invention. The signal diagram 1000 includes measurements sensed by the laser scanner. For instance, the no-switch area measurement 1010 is a measurement that prevents the laser from toggling. The no-switch area measurement 1010 at approximately time period −256 has a significant change, which causes the laser scanner to determine that toggling is inappropriate. In most embodiments, the no-switch area measurement 1010 is triggered when variable amplitudes of the demodulated signal are provided to the toggle decision component of the FPGA. The laser scanner is unable to toggle from the far laser to the near laser when the no-switch area measurement is high. The signaling diagram 1010 confirms that the laser toggling operates as expected when processing the code 910 on an object. In signal diagram 1010, the lasers are toggled when no switch area measurement is low before processing the code 810.

The laser scanner is configured with memory and processing elements to execute a method for toggling lasers. The lasers may include a near laser and a far laser that are focused differently. The method includes obtaining signal measurements from sensors in the laser scanner. In response to the signal measurements, the method includes selecting and activating one of the lasers to decode a code of an object.

Figure 11:
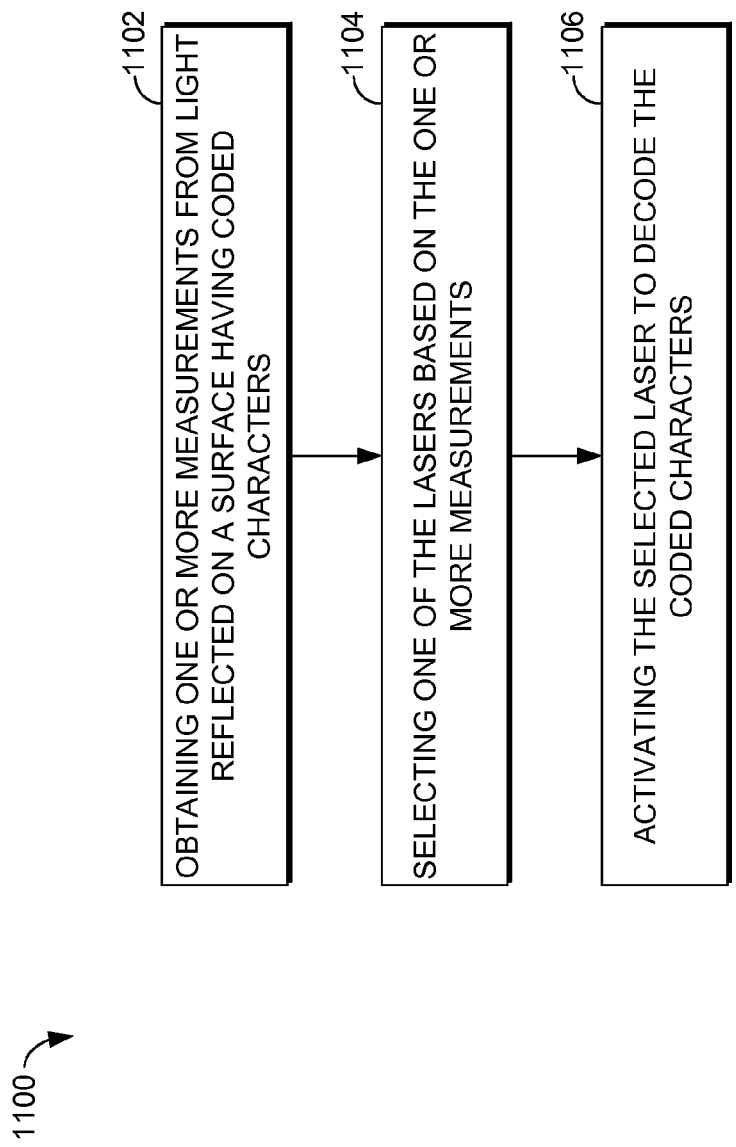
FIG. 11 is a logic diagram for selecting lasers for activation in the exemplary scanner in accordance with embodiments of the invention.

FIG. 11 is a logic diagram for a method 1100 of selecting lasers for activation in the exemplary scanner in accordance with embodiments of the invention. The method 1100 is initialized when the scanner is powered on. In step 1102, the scanner obtains one or more measurements from light reflected on a surface that has coded characters. In step 1104, the scanner selects a laser based on the one or more measurements. In step 1106, the scanner activates the selected laser to decode the characters.

The one or more measurements include any of the following: region of interest measurements, scan position measurements, or amplitude measurements. In some embodiments, the laser scanner includes at least one angle sensor to identify the position of a rotating polygon that reflects the reflected light.

In turn, the laser scanner is configured to switch between the one or more lasers when a phase signal measurement is within a predefined level. The selected laser is activated based on measurement of the one or more measurement signals in the current time period and a previous time period. In at least one embodiment, switching among lasers is prohibited when a no-switch measurement signal is activated in response to a measurement (amplitude measurement) from at least one sensor in the laser scanner.

Accordingly, a laser scanner for processing objects is provided. The laser scanner comprises at least one FPGA processor. The processor activates one of at least two lasers as the objects are transported within a field of view of the laser scanner. The processor activates the laser based on current and historical measurements obtained by sensors in the laser scanner. In turn, the FPGA processor may switch among lasers as variable-sized objects are processed.

The FPGA processor may run more advanced pattern detection techniques to identify an optimal time to toggle lasers. The processor reduces the likelihood of toggling the lasers in the middle of a barcode, which would greatly decrease the chance of decoding that barcode. One way to make sure that the better focused laser is activated across a given barcode target is to activate the correct laser diode based on the instantaneous measured distance of the laser spot on a target in relation to the laser scanner, along with historical measurements for objects processed by the laser scanner. The historical information is provided by the storage components of the FPGA.

Accordingly, the laser scanner system may include computer-readable media. The media includes any available media that can be accessed by the sensor array to store object properties. The computer-readable media includes both volatile and nonvolatile media, and removable and non-removable media. By way of example, and not limitation, computer-readable media may comprise computer storage media and communication media. Computer storage media includes volatile and nonvolatile, removable and non-removable media, implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and can be accessed by the conveyor system.

The laser scanner device, in certain embodiments, include a plurality of sensors that measure light reflected from a target of the laser beam. The laser scanner device also includes a programmable processor that is configured to toggle activation among the at least two laser diodes based on measurements extracted from the light reflected from the target. The programmable processor having storage for computer-usable instructions that perform a method for toggling the lasers. The processor is configured to obtain one or more of the measurements from light reflected on a surface having coded characters. The processor, in turn, selects one or more of the at least two laser diodes based on the one or more of the measurements. The one or more measurements that are obtained by sensors in the laser scan include region of interest measurements, scan position measurements, and amplitude measurements. The processor may then activate one of the at least two selected laser diodes to decode the coded characters based on the obtained measurements.

The scanner may prohibit switching among the lasers when a no switch measurement signal is activated in response to a measurement from at least one of the sensors in the laser scanner. In one embodiment, the no switch measurement signal is derived from a combination of the following signal measurements: region of interest, amplitude, phase, angular position, or signal measurements stored from previous scans. The no switch measurement signal prevents the lasers from toggling when it might disrupt or inhibit processing of the target.

Communication media may include any information delivery media, typically embodied in computer-readable instructions, data structures, program modules, and/or may include other data in a modulated data signal, such as a carrier wave or other transport mechanism. The term "modulated data signal" means a signal that has one or more of its characteristics set or changed in such a manner as to encode information in the signal. By way of example, and not limitation, communication media includes wired media, such as a wired network or direct-wired connection, or wireless media, such as acoustic, RF, infrared, Wi-Fi, WiMAX, GSM, or other wireless media. Combinations of any of the above also may be included within the scope of computer-readable media.

When operated in a networked environment, the laser scanner system may connect to one or more remote devices. The remote devices may include a personal computer, a server, a router, a network PC, a cell phone, a peer device, or other common network node, and typically includes many or all of the elements described above relative to the laser scanner system.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network.

The computing device includes a bus that directly or indirectly couples the following devices: memory, one or more processors, one or more presentation components, input/output ports, input/output components, and an illustrative power supply. The bus represents what may be one or more busses (such as an address bus, data bus, or combination thereof).

The computing device includes one or more processors that read data from various entities such as memory or I/O components. In one embodiment, the one or more processors include digital logic processors such as, but not limited to, a field programmable gate array, a digital application specific integrated circuit (ASIC) or any logic device that functions primarily off programmable gate logic like Complex Programmable Logic Devices (CPLD), Programmable Logic Arrays (PLA), Microprocessors, System on a Chip (SoC) devices and combinations thereof.

Presentation component(s) present data indications to a user or other device. Exemplary presentation components include a display device, speaker, printing component, vibrating component, etc. The I/O ports allow the computing device to be logically coupled to other devices, including the I/O components, some of which may be built in. Illustrative I/O components include a microphone, joystick, game pad, satellite dish, scanner, printer, wireless device, etc.

Aspects of the subject matter described herein are operational with numerous other general-purpose or special purpose computing system environments or configurations. Examples of well-known computing systems, environments, and/or configurations that may be suitable for use with aspects of the subject matter described herein include, but are not limited to, personal computers, server computers, handheld or laptop devices, multiprocessor systems, microcontroller-based systems, set-top boxes, programmable consumer electronics, network PCs, minicomputers, mainframe computers, distributed computing environments that include any of the above systems or devices, and the like.

While the embodiments of the invention are susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the embodiments of the invention.

The embodiments of the invention have been described in relation to a particular exemplary conveyor system and scanner, which are intended in all respects to be illustrative rather than restrictive. Alternative embodiments will become apparent to those of ordinary skill in the art to which the invention pertains without departing from its scope.

The technology claimed is:

1. A scanner device having a plurality of sensors that measure light reflected from a target of a laser beam and a digital programmable processor that is configured to toggle activation among at least two laser diodes based on measurements extracted from the light reflected from the target, wherein the programmable processor is a field programmable gate array that provides an activation signal that includes a modulation frequency and a selection of one of the at least two laser diodes.

2. The scanner device of claim 1, wherein the one or more measurements include region of interest measurements.

3. The scanner device of claim 1, wherein the one or more measurements include scan position measurements.

4. The scanner device of claim 1, wherein the one or more measurements include amplitude measurements.

5. The scanner device of claim 1, further comprising switching between the one or more lasers when a phase signal measurement is within a predefined level.

6. The scanner device of claim 5, wherein switching is prohibited when a no switch measurement signal is activated in response to a measurement from at least one sensor in the laser scanner.

7. The scanner device of claim 5, wherein the no switch measurement signal is derived from combination of the following signal measurements: region of interest, amplitude, phase, angular position, or signal measurements stored from previous scans.

8. The scanner device of claim 5, wherein the no switch measurement signal prevents the lasers from toggling when it might disrupt or inhibit processing of the target.

9. A computer-implemented method, the computer-implemented method comprising:
   measuring, by a plurality of sensors, light reflected from a target of a laser beam;
   toggling, by a digital programmable processor, at least two laser diodes based on measurements extracted from the light reflected from the target, wherein the digital programmable processor is a field programmable array; and
   providing an activation signal that includes a modulation frequency and a selection of one of the at least two laser diodes.

10. The computer-implemented method of claim 9, wherein the one or more measurements include region of interest measurements.

11. The computer-implemented method of claim 10, wherein the one or more measurements include scan position measurements.

12. The computer-implemented method of claim 10, wherein the one or more measurements include amplitude measurements.

13. The computer-implemented method of claim 10, further comprising switching between the one or more lasers when a phase signal measurement is within a predefined level.

14. The computer-implemented method of claim 13, wherein switching is prohibited when a no switch measurement signal is activated in response to a measurement from at least one sensor in the laser scanner.

15. The computer-implemented method of claim 13, wherein the no switch measurement signal is derived from a combination of the following signal measurements: region of interest, amplitude, phase, angular position, or signal measurements stored from previous scans.

16. The computer-implemented method of claim 13, wherein the no switch measurement signal prevents the lasers from toggling when it might disrupt or inhibit processing of the target.

17. One or more computer storage media executing a computer-implemented method, the computer-implemented method comprising:
   measuring, by a plurality of sensors, light reflected from a target of a laser beam;
   toggling, by a digital programmable processor, at least two laser diodes based on measurements extracted from the light reflected from the target, wherein the digital programmable processor is a field programmable array; and
   providing an activation signal that includes a modulation frequency and a selection of one of the at least two laser diodes.

18. The computer-implemented method of claim 17, further comprising switching between the one or more lasers when a phase signal measurement is within a predefined level.

19. The computer-implemented method of claim 18, wherein switching is prohibited when a no switch measurement signal is activated in response to a measurement from at least one sensor in the laser scanner.

20. The computer-implemented method of claim 13, wherein the no switch measurement signal is derived from a combination of the following signal measurements: region of interest, amplitude, phase, angular position, or signal measurements stored from previous scans; and the no switch measurement signal prevents the lasers from toggling when it might disrupt or inhibit processing of the target.

* * * * *